United States Patent [19]

Edmaier et al.

[11] Patent Number: 5,621,722

[45] Date of Patent: Apr. 15, 1997

[54] METHOD AND CIRCUIT ARRANGEMENT FOR DISTURBANCE-FREE REDIRECTION OF A MESSAGE CELL STREAM ONTO AN ALTERNATE ROUTE

[75] Inventors: Bernhard Edmaier, Seefeld; Wolfgang Fischer, Germering, both of Germany

[73] Assignee: Siemens Aktiengesellschaft, Munich, Germany

[21] Appl. No.: 438,787

[22] Filed: May 11, 1995

[30] Foreign Application Priority Data

May 11, 1994 [DE] Germany ............................ 44 16 719.9

[51] Int. Cl.$^6$ ............................................ H04L 1/22
[52] U.S. Cl. .................... 370/16; 370/100.1; 371/68.2; 340/827
[58] Field of Search ................. 455/8; 375/260, 375/267; 379/273; 340/825.1, 827; 371/68.1, 68.2; 370/16, 60, 68.1, 110.1, 100.1, 108

[56] References Cited

U.S. PATENT DOCUMENTS

| | | | |
|---|---|---|---|
| 5,408,463 | 4/1995 | Merchant et al. | 370/16 |
| 5,448,573 | 9/1995 | Yamaguchi | 370/16 |
| 5,452,286 | 9/1995 | Kitayama | 370/16 |
| 5,479,396 | 12/1995 | Kusano | 455/8 |

OTHER PUBLICATIONS

"Hitless Line Protection Switching Method for ATM Networks", H. Ohta et al, IEEE International Conference on Communications ICC (1993), pp. 272–276.

Primary Examiner—Benedict V. Safourek
Attorney, Agent, or Firm—Hill, Steadman & Simpson

[57] ABSTRACT

Within a cell-oriented communication network (ATMN), a message cell stream supplied to a switching equipment (CCa) located at the start of a path pair is duplicated by the switching equipment in response to a request. The two message cell streams resulting therefrom are supplied to a central synchronization device (AS) allocated to the switching equipment (CCb) located at the end of the path pair, being supplied thereto separately via an active path (AP) and via an alternate path (EP) allocated thereto. In the synchronization means, a synchronization of the two message cell streams ensues, while the message cell stream of the active path is being initially forwarded. After this, only the message cell stream of the alternate path is forwarded, upon disconnection of the central synchronization means from the transmission path.

18 Claims, 2 Drawing Sheets

5,621,722

METHOD AND CIRCUIT ARRANGEMENT FOR DISTURBANCE-FREE REDIRECTION OF A MESSAGE CELL STREAM ONTO AN ALTERNATE ROUTE

BACKGROUND OF THE INVENTION

The present invention is directed to a method and circuit arrangement for the redirection of a message cell stream from an active route onto an alternative route within a cell-oriented communication network.

Such a method and such a circuit arrangement are already known from Ohta, H., Ueda, H., "Hitless Line Protection Switching Method for ATM Networks", IEEE International Conference on Communications ICC '93, pp. 272–276. Given this known method or, respectively, given this known circuit arrangement, a separate control means is respectively provided at the output of a switching equipment located at the start of a line pair and is also provided at the input of a switching equipment located at the end of the line pair. A message cell stream to be transmitted is thereby duplicated by the control means located at the appertaining output in order to transmit two identical message cell streams over the line pair to the control means that is located at the end of the line pair. The latter effects a synchronization of the two supplied message cell streams as well as a forwarding of the message cell stream transmitted over the line of the line pair defined as alternate line after the synchronization has been carried out. Three different methods are disclosed for this. Specific control cells are employed in two of these methods, whereas the remaining method is a bit-by-bit comparison of the message cells transmitted over the line pair.

Given the known method or, respectively, given the known circuit arrangement, an interruption-free alternate routing of the entire line capacity is only possible between the two lines belonging to the line pair. No subcapacities, for example in the form of individual, virtual path connections, can be redirected between the two lines. Over and above this, a separate decentralized control means is required at the output side per line pair, so that a high circuit-oriented outlay is necessary when a plurality of line pairs proceeds between switching equipment connected to one another.

SUMMARY OF THE INVENTION

It is an object of the present invention to provide a method for redirecting individual virtual paths or, respectively, virtual connections from an active route onto an alternative route within a cell-oriented communication network.

In general terms the present invention is a method for redirecting a message cell stream transmitted in a virtual path or, respectively, during the course of a virtual connection via an active route onto an alternate route that forms a virtual route pair together with the active route in a cell-oriented communication network having a plurality of switching equipment. The message cell stream is first transmitted via the active route to a switching equipment located at an end of the route pair by a switching equipment located at a start of the path pair. In response to a request signal, the message cell stream is duplicated in the switching equipment located at the start of the route pair. The two message cell streams resulting therefrom are separately supplied via the active route and via the alternate route to a central synchronization means allocated to the switching equipment located at the end of the route pair and temporarily assigned to the virtual path or, respectively, to the virtual connection. Proceeding from this central synchronization means, on the one hand, only the message cell stream supplied via the active route is initially forwarded via the allocated switching equipment and, on the other hand, the two supplied message cell streams are synchronized. When such a synchronization has been achieved by the central synchronization means, the message cell stream supplied via the alternate route is now forwarded via the allocated switching equipment instead of the message cell stream initially supplied via the active route. Subsequently, the central synchronization means is disconnected from the transmission route for the message cell stream conducted via the alternate route.

Advantageous developments of the method of the present invention are as follows.

The alternate route is defined and set up only in response to the request signal.

The alternate route and the transmission capacity required therefor are already defined together with the active route, but the transmission of the message cell stream ensues exclusively via the active route until the appearance of the request signal.

Only the course of the alternate route is defined together with the active route, but the transmission capacity required for this alternate route is not requested until the occurrence of the request signal.

The transmission capacity required for the alternate route is used for low-priority message traffic until the appearance of the request signal.

The method is modified such that the switching equipment located at the start of the route pair constantly duplicates the message cell stream supplied thereto and the two message cell streams resulting therefrom are separately supplied via the active route and via the alternate route to the central synchronization means over the switching equipment located at the end of the route pair. Proceeding from this central synchronization means, only the message cell stream supplied via the active route is forwarded via the allocated switching equipment on the one hand and, on the other hand, the two supplied message cell streams are constantly synchronized. Given outage of the active route, the message cell stream arriving via the alternate route is forwarded.

A respective control cell is respectively inserted at defined time intervals into the two message cell streams supplied to the central synchronization means. A sequence number that continuously changes from control cell to control cell is contained in the control cells. A synchronization of the two message cell streams with respect to the compensation of the differences in transit time caused by the active route and alternate route is undertaken by the central control means using the sequence numbers appearing in the control cells of the two message cell streams.

The compensation of the differences in running time is implemented step-by-step by the central synchronization means.

In general terms the present invention is also circuit arrangement for the redirection of a message cell stream transmitted in a virtual path or, respectively, during the course of a virtual connection via an active route onto an alternate route that forms a virtual route pair together with the active route in a cell-oriented communication network having a plurality of switching equipment. In the circuit arrangement a switching equipment is located at the start of the route pair and is configured such that the message cell stream of the appertaining virtual path or, respectively, of the appertaining virtual connection supplied thereto is duplicated in response to a request signal. The two message cell streams resulting therefrom are separately supplied via the active route and via the alternate route to a switching equipment located at the end of the path pair. A central synchronization means that receives the two message cell streams is allocated to the switching equipment located at the end of the route pair. The synchronization means is temporarily suppliable with the two messages streams via the allocated switching equipment. On the one hand, the synchronization means initially in turn supplies only the message cell stream from the active route to the allocated switching equipment for a forwarding and, on the other hand, synchronizes the two supplied message cell streams. After synchronization has been carried out, the message cell stream supplied via the alternate route is in turn supplied to the allocated switching equipment, instead of the message cell stream supplied via the active route. The central synchronization means can in turn be disconnected from the transmission of the message cell stream supplied via the alternate route proceeding from the allocated switching equipment.

Advantageous developments of the circuit arrangement of the present invention are as follows.

A plurality of central synchronization equipment is provided, each thereof being respectively individually allocatable to a virtual path to be redirected or, respectively, to a virtual connection to be redirected.

The respective central synchronization equipment has its input side connected to an output line terminal and has its output side connected to an input line terminal of the allocated switching equipment.

The present invention has the advantage that the redirection of a message cell stream is undertaken using a central synchronization means that is only temporally allocated to the respective virtual path or, respectively, to the respective virtual connection. A further advantage is that such a central synchronization means can be added at any time without additional circuit-oriented measures being required in the individual switching equipment of the ATM communication network.

BRIEF DESCRIPTION OF THE DRAWINGS

The features of the present invention, which are believed to be novel, are set forth with particularity in the appended claims. The invention, together with further objects and advantages may best be understood by reference to the following description taken in conjunction with the accompanying drawings, in the several Figures of which like reference numerals identify like elements, and in which:

DESCRIPTION OF THE PREFERRED EMBODIMENTS

Figure 1:
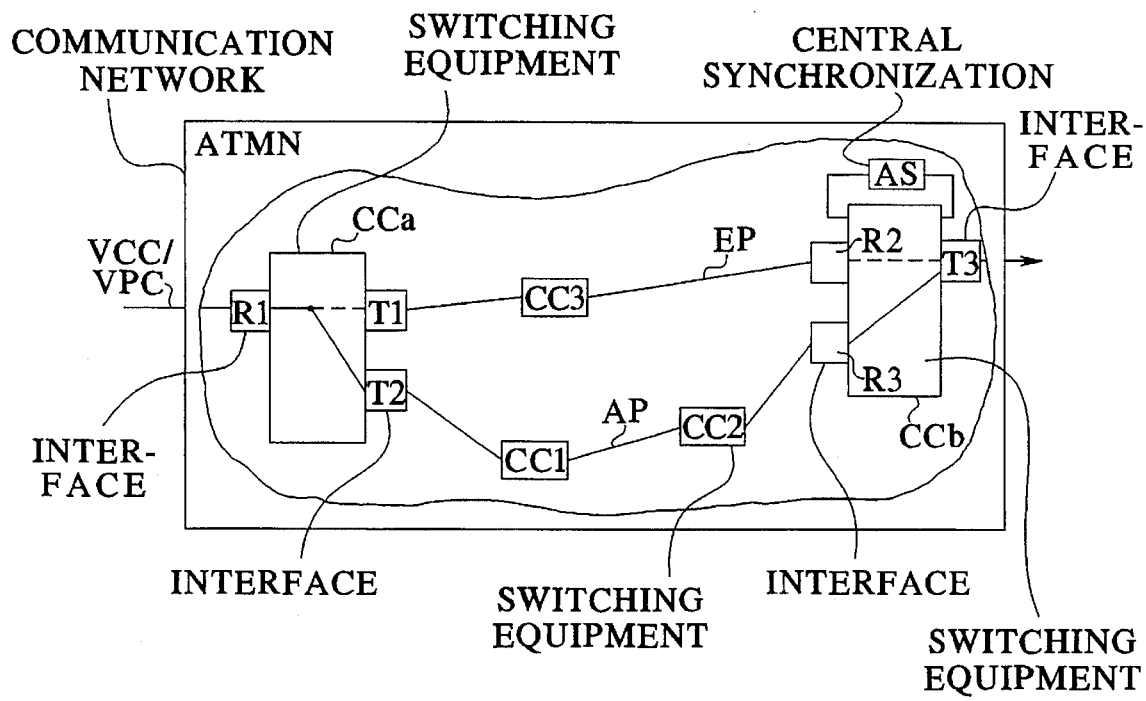
FIG. 1 shows portions of an ATM communication network wherein the present invention is applied in a block circuit diagram.

FIG. 1 shows portions of an ATM communication network operating according to an asynchronous transfer mode and has a plurality of switching equipment. Within this ATM communication network, virtual connections that are set up in a known way and proceed in the same direction are conducted, for example, via what are referred to as virtual paths, that is the virtual paths each respectively carry a plurality of virtual connections. Let the switching equipment thereby be fashioned as what are referred to as "cross connects" via which virtual paths are permanently established and maintained over a longer time. These switching equipment, however, can also be composed of switching equipment via which virtual paths can be selectively set up during the course of a corresponding call setup. Since such a virtual path can, for example, contain up to 65536 virtual connections and can also comprise a high aggregate bit rate of, for example, up to 2.5 Gbytes/s, such a virtual path must be redirected as quickly as possible as needed onto an alternate route without loss of message cells. An alternate path is therefore defined within the ATM communication network for every path, referred to below as active path. The respective active path and the appertaining alternate path shall be referred to below as path pair and thereby proceed via separate routes. Let it already be pointed out here that the present invention shall in fact be set forth below with reference to virtual paths set up within the ATM communication network but that it can also be applied to individual virtual connections or, respectively, path groups that can respectively proceed via a path pair formed of an active path and of an alternate path.

Standing for a plurality of virtual path pairs proceeding within the ATM communication network ATMN, FIG. 1 schematically shows a virtual path pair that can be set up between two switching equipment CCa and CCb. The switching equipment Cca thereby represents the start of the virtual path pair and is supplied at an interface means R1 with the message cells appearing within an offering path VPC. Proceeding from the switching equipment CCa, the active path AP proceeds via an interface means T2 connected thereto as well as via two intermediate switching equipment CC1 and CC2 to an interface means R3 of the switching equipment CCa. The appertaining alternate path EP, by contrast, proceeds via an interface equipment T1 belonging to the switching equipment CCa and an intermediate switching equipment CC3 to an interface means R2 of the switching equipment CCb. In a normal case, let message cells thereby be forwarded only over the active path AP to an interface means T3 representing an output of the switching equipment CCb. Only in response to an initiation, is a switch made from the active path AP onto the appertaining alternate path EP using a central synchronization means AS "Alignment Server" allocated to the switching equipment CCb, that is the message cells arriving over this alternate path EP are forwarded to the interface means T3 after the switchover.

Dependent on the design of the ATM communication network, moreover, the alternate path EP can be defined either only in response to the initiation based on the criterion of the network load and on the required transmission capacity, or can already be defined with respect to the route, whereby a transmission capacity corresponding to the transmission capacity is then requested for the alternate path EP only in response to an initiation. The requested transmission capacity can thereby be used for a low-priority message traffic until an initiation.

The method for switching from the active path AP onto the alternate path EP shall be discussed in greater detail below with reference to FIG. 2.

Figure 2:
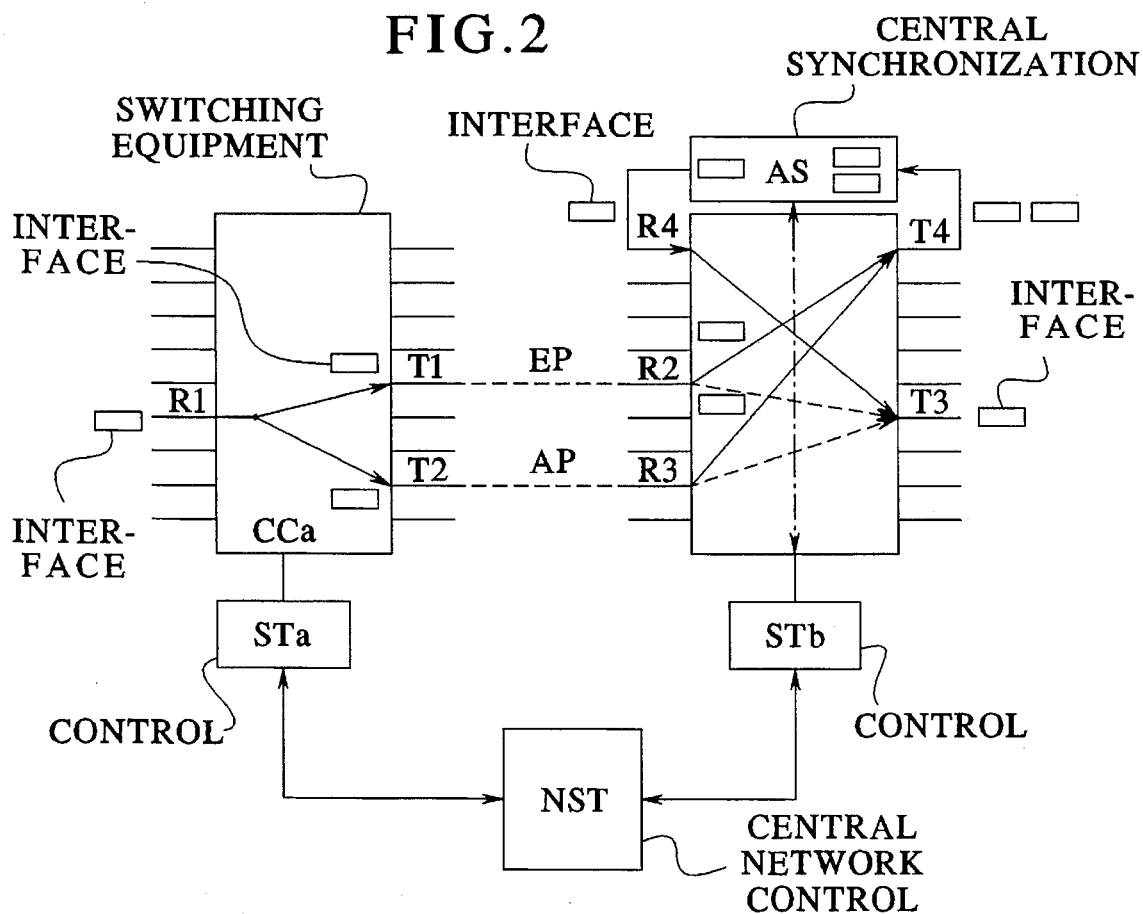
FIG. 2 shows the interaction of two communication equipment of the present invention.

Of the switching equipment shown in FIG. 1, only the two switching equipment CCa and CCb are shown in FIG. 2. It is thereby assumed that message cells initially arriving via the offering path VPC are exclusively transmitted over the active path AP to the interface means T3 of the switching equipment CCb proceeding from the interface means R1 of the switching equipment CCa. For this purpose, let the message cells be forwarded with the switching equipment CCa and CCb according, for example, to what is referred to as the "self-routing" principle, in that an internal "self-routing" cell header is placed in front of every message cell upon entry into the respective switching equipment based on the criterion of the external cell header respectively present therein. This internal cell header is offered, for example by a control means STa, STb allocated to the respective switching equipment CCa, CCb, during the course of setting up the virtual path and contains all routing information for the forwarding of the message cells belonging to the virtual path within the respective switching equipment CCa, CCb. In the case of the switching equipment CCa, these are information for the transmission of message cells between the interface means R1 and the interface means T2. By contrast thereto, the internal cell header offered for the virtual path in the switching equipment CCb contains information for the transmission of message cells from the interface means R3 to the interface means T3. The respective internal cell header is thereby stored in the interface means R1 or, respectively, R3 and in corresponding interface means of the remaining switching equipment of the communication network ATMN involved in the virtual path.

Instead of the "self-routing" principle, moreover, what is referred to as the route interpreter principle can also be alternatively employed for the forwarding of message cells within the respective switching equipment, only the external cell header belonging to the respective message cell being modified therein.

A switching of the virtual path AP onto the alternate path EP is initiated in response to a redirect signal that, for example, is supplied to the control means STa, STb of one of the switching equipment CCa and CCb proceeding from a central network control means NST in the form of at least one control cell ("operation, administration and maintenance" cell) referred to below as OAM cell. Let the control means that receives such a redirect signal thereby be, for example, the control means STb allocated to the switching equipment CCb. In response thereto, this control means offers a new internal cell header in order to redirect the message cells belonging to the appertaining virtual path AP proceeding from the interface means R3 onto an interface means T4 to which the aforementioned central synchronization means AS is connected at the input side. This new internal cell header is supplied to the interface means R3 and is stored thereat instead of the internal cell header previously retained for the virtual path. Subsequently arriving message cells of the virtual path AP are thereby no longer directly supplied to the synchronization means T3 but are first supplied to the central synchronization means AS that likewise receives the OAM cell supplied to it via a control channel set up in the switching equipment CCb.

At the output side, the central synchronization means AS is connected to an interface means R4 in which an internal cell header is deposited, this cell header preceding the message cells passing through this central synchronization means AS for forwarding to the interface means T3. The central synchronization means AS is thus co-involved in the transmission of message cells that arrive over the active path.

After the cut-in of the central synchronization means AS, a control signal in the form of at least one OAM cell indicating this cut-in is transmitted to the control means STa of the switching equipment CCa either proceeding from the synchronization means or from the appertaining control means ST. For example, a virtual control channel set up between the two switching equipment can be used for this purpose, this virtual control channel being set up, for example, in a path that is allocated to the active path AP but proceeds in the opposite direction. In response to the appearance of such an OAM cell, the internal cell header stored until then in the interface means R1 for the virtual path AP is then modified such by the control means STa that following message cells are duplicated and the message cells that derive therefrom and are allocated to one another are separately transmitted via the active path AP and the appertaining alternate path EP. In response to the cut-in of the central synchronization means AS and under the control of the control means STb, an internal cell header is deposited in the interface means R2 for this alternate path, the message cells that belong to this alternate path being likewise transmitted via the interface means T4 to the central synchronization means AS as a result of this internal cell header. Of these message cells, however, only the message cells supplied via the active path EP are initially forwarded in an synchronization phase that now begins. During the synchronization phase (which shall be discussed in greater detail below), however, the message cell streams arriving via the active path AP and the alternate path EP are synchronized in that the different delay times that appear on these paths are compensated. When a shorter delay time thereby occurs on the active path than on the alternate path, then the message cells transmitted over the active path are delayed in order to achieve synchronism with the message cells on the alternate path. When, by contrast, the message cells on the alternate path have a shorter delay than the appertaining message cells on the active path, then the message cells transmitted over the alternate path are correspondingly delayed.

Given a synchronization achieved as a result thereof, the central synchronization means AS then switches onto the alternate path, that is only the message cells arriving via the alternate path are transmitted to the interface means T3 beginning from this point in time. Following thereupon, a control signal, for example in the form of an OAM cell that confirms the switchover, is supplied to the appertaining control means STb. Following thereupon, an internal cell header for the alternate path EP is deposited in the interface means R2 under the control of this control means, the following message cells being directly transmitted to the interface means T3 as a result of this internal cell header, that is the interface means T3 is disconnected from the previous transmission route. Since, given this disconnect, message cells still output by the central synchronization means AS can be overtaken by message cells directly supplied to the interface means T3 over the alternate path, care must be exercised to see that the message cells are forwarded in the correct sequence. For example, a buffer memory in the interface means T3 can be used for this purpose, the message cells to be forwarded being sorted according to the required sequence therewith. Over and above this, a control signal in the form of at least one OAM cell indicating the switch onto the alternate path is supplied to the control means STa of the switching equipment CCa, whereupon the internal cell header previously stored in the interface means R1 is modified under the control of the control means STa such that following message cells are forwarded only via the alternate path EP.

It was assumed above that the redirect signal (OAM cell or, respectively, cells) had been supplied to the control means STb proceeding from the network control means NST. Alternatively thereto, this OAM cell or cells can also be supplied to the control means STa of the switching equipment CCa. In this case, a defined OAM cell is first transmitted to the control means STb proceeding from the control means STa over, for example, the active path AP, the above-described control events sequencing in response thereto in the control means STb and, subsequently, in the control means STa. That is, the part-time transmission of message cells proceeding from the switching equipment CCa both via the active path AP as well as via the alternate path EP and the subsequent, exclusive transmission of message cells via the alternate path EP only ensue after the switching equipment CCb has output an OAM cell that indicates that the cut-in of the central synchronization means AS has been accomplished.

Figure 3:
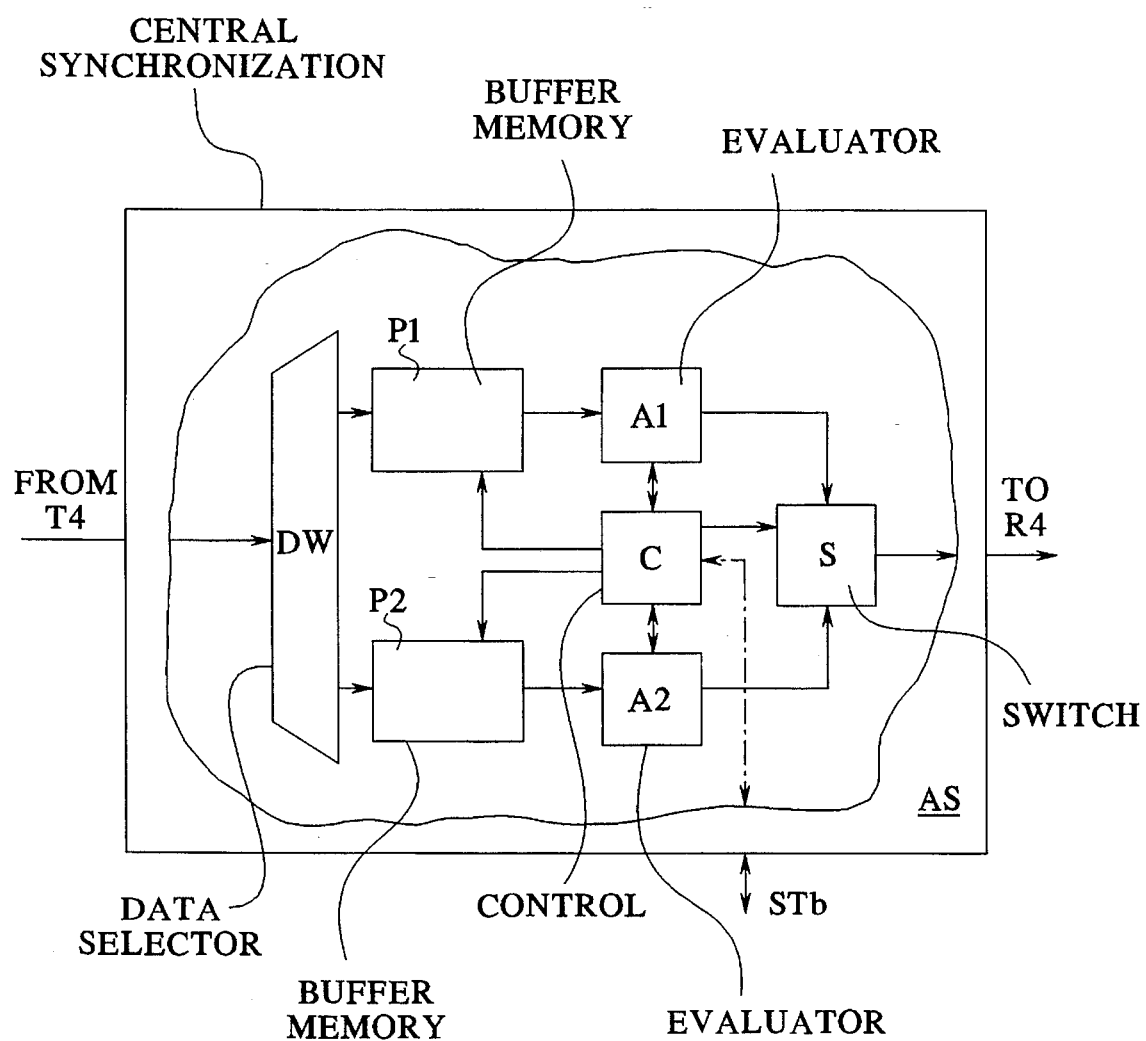
FIG. 3 shows portions of a possible structure of a central synchronization means that is only schematically illustrated in FIG. 1.

The aforementioned synchronization method as well as a possible structure of the central synchronization means AS shall now be discussed in greater detail with reference to FIG. 3. Only those circuit parts of this central synchronization means AS that are relevant to an understanding of the present invention are thereby recited. According thereto, the central synchronization means AS has a data selector DW at the input side to which the message cell stream appearing via the active path AP proceeding from the interface means T4 is first supplied and to which the message cell stream appearing via the alternate path EP during the synchronization phase is subsequently additionally supplied in multiplex mode. An especially identified OAM cell is thereby respectively inserted into the respective message cell stream at predetermined time intervals, for example by the switching equipment CCa. These OAM cells respectively have a sequence number that changes continuously from OAM cell to OAM cell. In the present exemplary embodiment, a respective OAM cell is inserted after respectively 256 message cells, while delaying the respective message cell stream, and the respective sequence number is coded by 8 bits. Alternatively thereto, a dummy or empty cell, that is contained in the respective message cell stream and follows the predetermined plurality of message cells, can also be replaced by such an OAM cell. When such a dummy cell thereby does not appear within a predetermined time, for example a time defined by 128 cells, than an OAM cell is designationally inserted into the message cell stream, namely while delaying the message cell stream. Given this procedure, however, the predetermined time intervals for the insertion of OAM cells should be adhered to on average.

Proceeding from the data selector DW, the message cell stream of the active path AP passes through a buffer memory P1, whereas the message cell stream of the alternate path EP is supplied to a buffer memory P2. Each of these buffer memories P1, P2 is followed by a separate evaluation means A1, A2, whereby these evaluation means A1, A2 are in communication in common with a control means C. This is connected to a control input of a switch means S that represents the output of the central synchronization means AS and that also has its input side operatively connected to respective outputs of the evaluation means A1, A2. In response to the appearance of an aforementioned OAM cell that requests a switchover, this switch means S is thereby driven by the control means C such that only those message cells passing through the buffer memories P1 and P2 that arrive via the active path AP are initially forwarded. However, the respective evaluation means A1, A2 thereby constantly monitors the appearance of OAM cells and the respective OAM cell is supplied to the control means C. On the basis of the sequence number respectively carried in the OAM cells, this first determines which of the two message cell streams is the leading message cell stream. Following message cells of the leading message cell stream are then intermediately stored in the respective buffer memory (P1 or P2) under the control of the control means C before being forwarded until a sequence number appears in the trailing message cell stream that corresponds to the sequence number that was just identified for the leading message cell stream. Given equality of these sequence numbers, that is when synchronization of the two message cell streams has been achieved, the switch means S is then driven by the control means C such that only message cells arriving via the alternate path are then forwarded.

For that case wherein the message cell stream transmitted via the active path is the leading message cell stream, there is thereby also the possibility in the present exemplary embodiment of implementing a gradual delay instead of the abrupt delay that was just set forth. In this embodiment this message cell stream is delayed step-by-step under the control of the control means C when passing through the buffer memory P1 until two identical sequence numbers are simultaneously present in the control means C. In a corresponding way, a delay to be initially realized for the alternate route can in turn be gradually dismantled after the switchover has ensued. This gradual modification of the delay thereby yields the advantage that delay time fluctuations can be kept within tolerable limits. This is especially significant when audio, video or multimedia connections that require guaranteed, minimum delay time fluctuations proceed within the virtual path to be switched. The burst size caused by the forwarding of message cells is also limited by such a gradual delay.

That case wherein a single active path can be redirected onto an allocated alternate path was considered above only as an example. Such a central synchronization means can also be allocated to a plurality of virtual paths in multiplex mode when these are to be sequentially switched onto an allocated alternate path. Given a required, simultaneous redirection of virtual paths, a plurality of central synchronization means corresponding in number to the plurality of virtual paths to be simultaneously switched can be provided.

Over and above this, let it also be pointed out that the above method for switching virtual paths onto alternate paths can also be modified such that a message cell stream supplied proceeding from the switching equipment CCa can, by duplication, be constantly transmitted both via an active path as well as via an allocated alternate path and the two message cell streams resulting therefrom are supplied to the respective synchronization means AS. A synchronization as set forth above ensues therein in order to switch onto the remaining path given outage of one of the paths.

Finally, let it also be pointed out that the redirection of a virtual path onto an alternate path was set forth above merely as an example. The present invention, however, is not limited to this application. On the contrary, individual virtual connections or path groups covering a plurality of virtual paths can also be redirected from an active transmission path onto an allocated alternate path. Over and above this, the present invention can be applied not only in ATM communication networks but can be generally employed in cell-oriented communication networks when message cell streams within these communication networks are to be redirected from an active route onto an alternate route disturbance-free, that is without cell loss, without duplication of cells, without falsification of information in the individual cells and upon observation of the cell sequence.

The present invention is not limited to the particular details of the method and apparatus depicted and other modifications and applications are contemplated. Certain other changes may be made to the above described method and apparatus without departing from the true spirit and scope of the invention herein involved. It is intended, therefore, that the subject matter in the above depiction shall be interpreted as illustrative and not in a limiting sense.

What is claimed is:

1. A method for redirecting a message cell stream transmitted in a virtual path or during the course of a virtual connection via an active route onto an alternate route that forms a virtual route pair together with an active route in a cell-oriented communication network having a plurality of switching equipment, comprising the steps of:

transmitting a message cell stream via an active route from a first switching equipment located at a start of the route pair to a second switching equipment located at an end of the route pair;

duplicating, in response to a request signal, the message cell stream supplied to the first switching equipment to form duplicate first and second message cell streams;

separately supplying the first and second message cell streams via the active route and via the alternate route, respectively, to a central synchronization means allocated to the second switching equipment or virtual connection, initially supplying from said central synchronization means only the first message cell stream, supplied via the active route, to the allocated second switching equipment for forwarding;

synchronizing in the central synchronization means the first and second message cell streams;

supplying, when such a synchronization has been achieved by the central synchronization means, the second message cell stream, supplied via the alternate route, to the allocated second switching equipment for forwarding, instead of the first message cell stream initially supplied via the active route; and disconnecting, after the second message cell stream has been forwarded, the central synchronization means from the alternate route for the second message cell stream.

2. The method according to claim 1, wherein the alternate route is defined and set up only in response to the request signal.

3. The method according to claim 1, wherein the alternate route and transmission capacity required therefor are pre-defined together with the active route, transmission of the first message cell stream ensuing exclusively via the active route until appearance of the request signal.

4. The method according to claim 1, wherein the alternate route is pre-defined together with the active route, a transmission capacity required for the alternate route being requested after occurrence of the request signal.

5. The method according to claim 3, wherein the transmission capacity required for the alternate route is used for low-priority message traffic until appearance of the request signal.

6. The method according to claim 1, wherein said method further comprises:

in regards to the second step, constantly duplicating, in the first switching equipment located at the start of the route pair, the supplied message cell stream to form the first and second message cell streams that are separately supplied via the active route and via the alternate route, respectively, to the central synchronization means over the second switching equipment that is located at the end of the route pair;

in regards to the third to fifth steps, supplying from said central synchronization means the first message cell stream, supplied via the active route, to the allocated second switching equipment for forwarding, and constantly synchronizing the first and second message cell streams in the central synchronizing means; and in regards to the sixth step, supplying, given outage of the active route, the second message cell stream, supplied via the alternate route, to the allocated second switching equipment.

7. The method according to claim 1, wherein the method further comprises the steps of:

respectively inserting respective control cells at defined time intervals into the first and second message cell streams supplied to the central synchronization means, the respective control cells containing sequence numbers that continuously change from control cell to control cell; and synchronizing the first and second message cell streams, with respect to compensation of differences in transit time caused by the active route and alternate route, in the central synchronization means using the sequence numbers appearing in the control cells of the first and second message cell streams.

8. The method according to claim 7, wherein the compensation of the differences in running time is implemented step-by-step by the central synchronization means.

9. A circuit arrangement for redirection a message cell stream transmitted in a virtual route or during the course of a virtual connection via an active route onto an alternate route that forms a virtual route pair together with an active route in a cell-oriented communication network having a plurality of switching equipment, comprising:

a first switching equipment located at a start of the route pair, the first switching equipment receiving a message cell stream of the appertaining virtual route or of the appertaining virtual connection and duplicating the received message cell stream in response to a request signal to form first and second message cell streams;

a second switching equipment connected to the first switching equipment, the first switching equipment supplying the first and second message cell streams resulting separately via the active route and via the alternate route, respectively, to the second switching equipment located at the end of the route pair;

at least one central synchronization means allocated to the second switching equipment located at the end of the route pair, said synchronization means being temporarily supplied with the first and second messages streams via the allocated second switching equipment, the synchronization means initially supplying only the first message cell stream to the allocated second switching equipment for forwarding, and, after synchronization has been carried out, supplying the second message cell stream to the allocated second switching equipment instead of the first message cell stream; and wherein, after the second message cell stream is supplied to the second switching equipment the central synchronization means is no longer supplied with the second message cell stream.

10. The circuit arrangement according to claim 9, wherein a plurality of message cell streams are provided and wherein the circuit arrangement comprises a plurality of central synchronization equipment, each thereof being respectively individually allocatable to a virtual route to be redirected or to a virtual connection to be redirected.

11. The circuit arrangement according to claim 9, wherein the central synchronization means has an input side connected to an output line terminal of the allocated second switching equipment and has an output side connected to an input line terminal of the allocated second switching equipment.

12. A method for redirecting a message cell stream transmitted in a virtual route or during the course of a virtual connection via an active route onto an alternate route that forms a virtual route pair together with an active route in a cell-oriented communication network having a plurality of switching equipment, comprising the steps of:

transmitting a message cell stream via an active route from a first switching equipment located at a start of the route pair to a second switching equipment located at an end of the route pair;

duplicating, in response to a request signal, the message cell stream supplied to the first switching equipment to form duplicate first and second message cell streams;

separately supplying the first and second message cell streams via the active route and via the alternate route, respectively, to a central synchronization means allocated to the second switching equipment;

initially supplying from said central synchronization means only the first message cell stream, supplied via the active route, to the allocated second switching equipment for forwarding;

synchronizing in the central synchronization means the first and second message cell streams;

supplying, when such a synchronization has been achieved by the central synchronization means, the second message cell stream, supplied via the alternate route, to the allocated second switching equipment for forwarding, instead of the first message cell stream initially supplied via the active route; and disconnecting, after the second message cell stream has been forwarded, the central synchronization means from the alternate route for the second message cell stream.

13. The method according to claim 12, wherein the alternate route is defined and set up only in response to the request signal.

14. The method according to claim 12, wherein the alternate route and transmission capacity required therefor are pre-defined together with the active route, transmission of the first message cell stream ensuing exclusively via the active route until appearance of the request signal.

15. The method according to claim 12, wherein the alternate route is pre-defined together with the active route, a transmission capacity required for the alternate route being requested after occurrence of the request signal.

16. The method according to claim 14, wherein the transmission capacity required for the alternate route is used for low-priority message traffic until appearance of the request signal.

17. The method according to claim 12, wherein the method further comprises the steps of:

respectively inserting respective control cells at defined time intervals into the first and second message cell streams supplied to the central synchronization means, the respective control cells containing sequence numbers that continuously change from control cell to control cell; and synchronizing the first and second message cell streams, with respect to compensation of differences in transit time caused by the active route and alternate route, in the central synchronization means using the sequence numbers appearing in the control cells of the first and second message cell streams.

18. The method according to claim 17, wherein the compensation of the differences in running time is implemented step-by-step by the central synchronization means.

* * * * *